United States Patent [19]

Bennett

[11] 4,430,639
[45] Feb. 7, 1984

[54] VISUAL MESSAGE INTERCOMMUNICATION UNIT AND SYSTEM

[75] Inventors: Dale L. Bennett, Lafayette, Calif.; Robert J. Grady, Huntsville, Ark.; James L. Konsevich, San Jose, Calif.; Perry H. Vartanian, Woodside, Calif.

[73] Assignee: Benvar Associates, c/o Dale Bennett, New York, N.Y.

[21] Appl. No.: 265,773

[22] Filed: May 21, 1981

[51] Int. Cl.³ .............................................. H04B 3/54
[52] U.S. Cl. ........................ 340/310 A; 340/310 CP; 340/711; 340/717; 340/825.54
[58] Field of Search ........... 340/310 A, 310 CP, 717, 340/711, 825.19, 825.54

[56] References Cited

U.S. PATENT DOCUMENTS

| | | | |
|---|---|---|---|
| 3,166,636 | 1/1965 | Rutland et al. | 340/717 |
| 3,553,675 | 1/1971 | Shaver et al. | 340/310 A |
| 3,976,995 | 8/1976 | Sebestyen | 340/717 |
| 4,075,426 | 2/1978 | Gould | 179/1 H |
| 4,162,486 | 7/1979 | Wyler | 340/310 A |
| 4,173,754 | 11/1979 | Feiker | 340/310 R |
| 4,185,272 | 1/1980 | Feiker | 340/168 R |
| 4,200,862 | 4/1980 | Campbell et al. | 340/310 A |
| 4,293,855 | 10/1981 | Perkins | 340/825.19 |

*Primary Examiner*—Glen R. Swann, III
*Attorney, Agent, or Firm*—David Pressman

[57] ABSTRACT

Each of a plurality of message terminal units (10, 12, 14, 16) has a keyboard (20) for entry of data, a visual display (22) for display of entered and received data, and a logic system (FIG. 4) for processing received and transmitted messages. Each unit stores in a CPU (52) a dedicated user terminal identification. Each transmitted message is annexed to a destination terminal identification and said user terminal identification (FIG. 5). Only a unit with a stored user identification identical to the destination identification in a transmitted message can receive and display transmitted messages. Upon receipt of a message, a terminal sends an automatic response to the sending terminal, which provides an appropriate indication to the sender. The receiver can send a manual acknowledgement (42) to the sender, which causes the message to be cleared from the sender's display. The units transmit messages via pulse modulation of a high frequency carrier over a supply power line (26) so that no special wiring is required. A unit can send messages to plural destinations and indicate which destination units have received the message. Optionally, a user can store plural incoming messages (FIG. 7) and selectively display same. Also, optionally, a unit can send its user's identification indicia, upon attempted entry thereof, to all other units which will compare the attempted identification entry indicia with their stored user identification indicia (FIG. 8) and indicate if the same indicia are already in use, thereby preventing two users from using the same indicia so as to insure privacy of transmission. A unit can be made to automatically send a fixed message upon receipt of any message, this feature being most useful to indicate a user's temporary absence.

18 Claims, 11 Drawing Figures

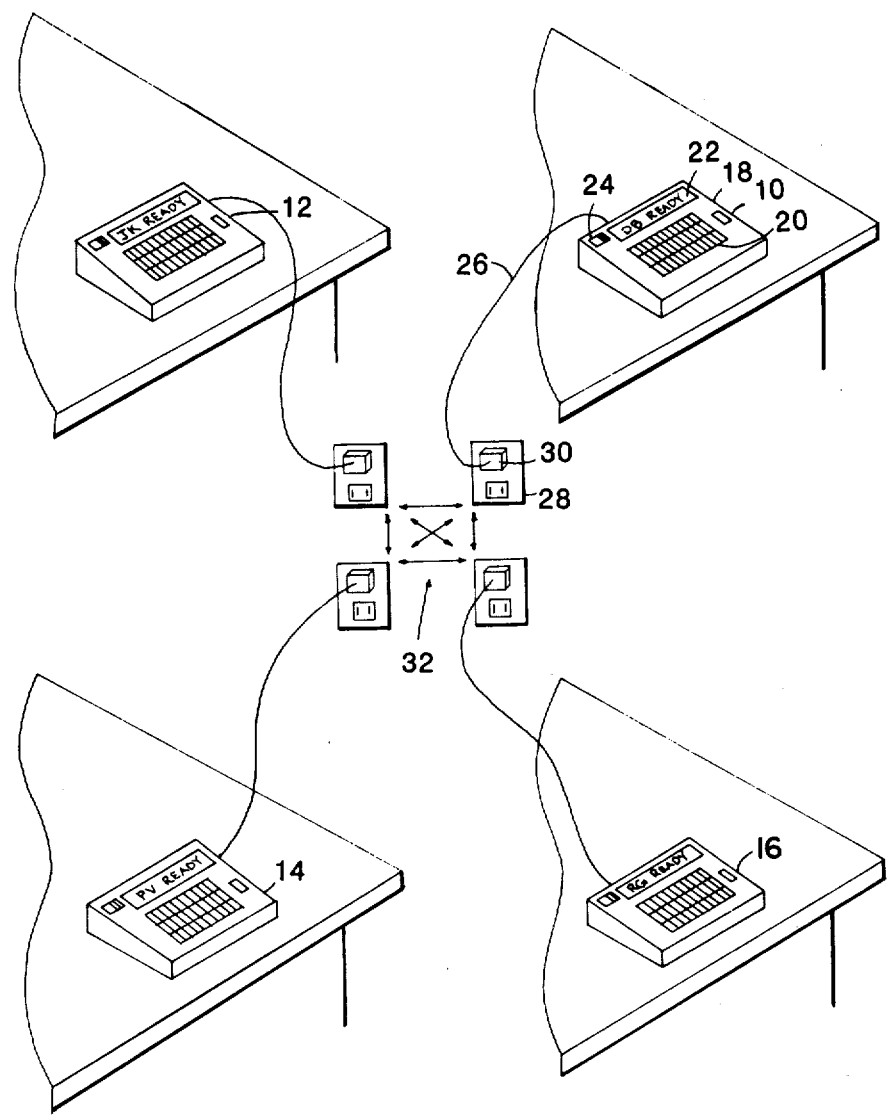
FIG.1 — INTERCOMMUNICATOR SYSTEM INSTALLATION

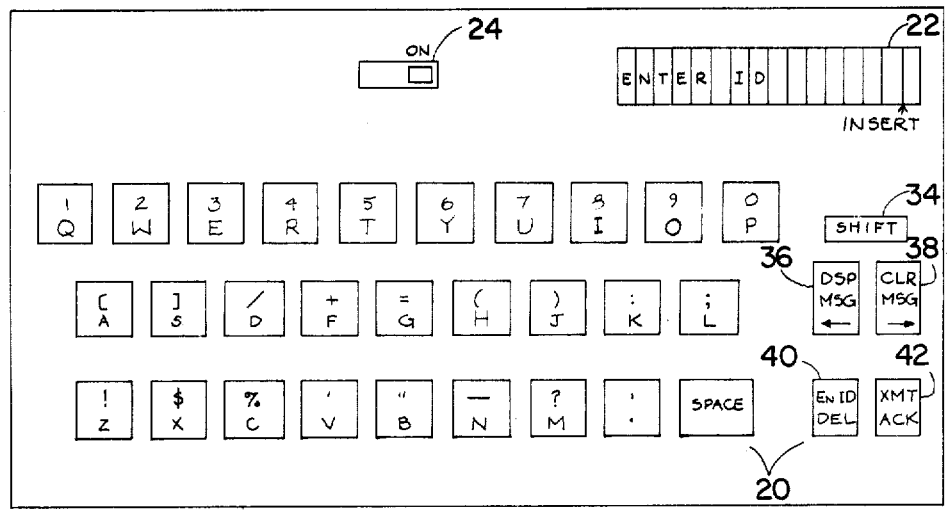
FIG. 2 KEYBOARD & DISPLAY PANEL LAYOUT
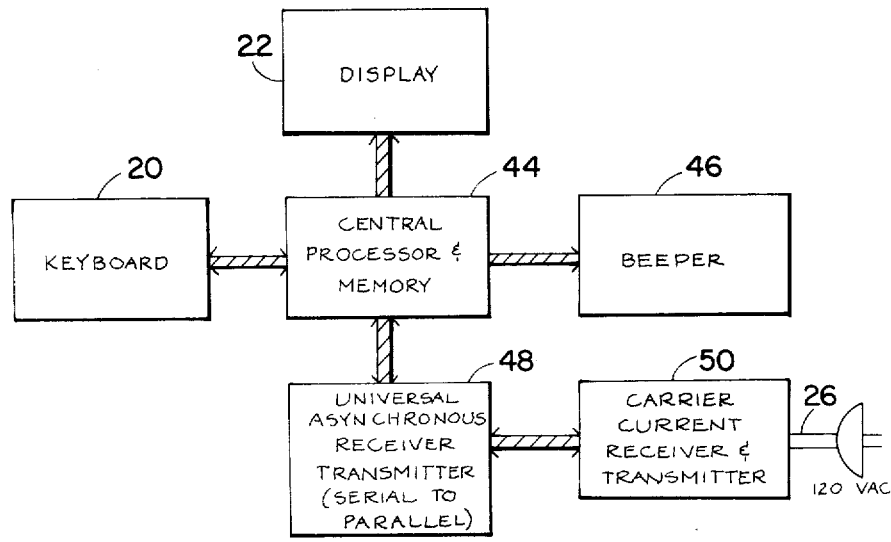
FIG. 3 - SYSTEM BLOCK DIAGRAM

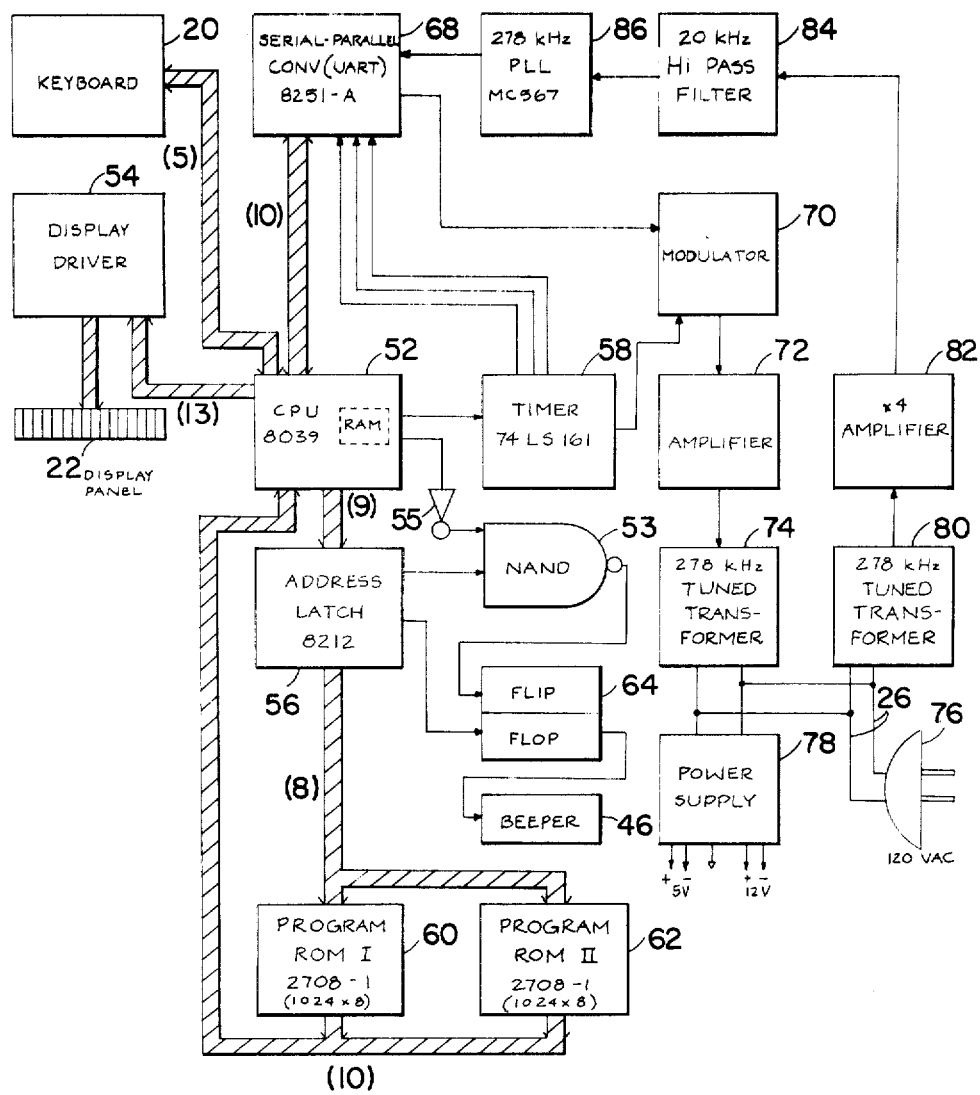
FIG.4 — COMPONENT BLOCK DIAGRAM

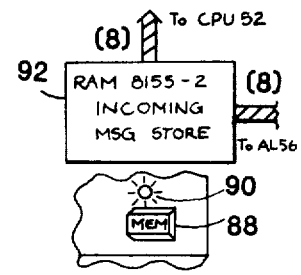
FIG. 6—HARDWARE FOR MESSAGE STORAGE
FIG. 5—MESSAGE FORMAT
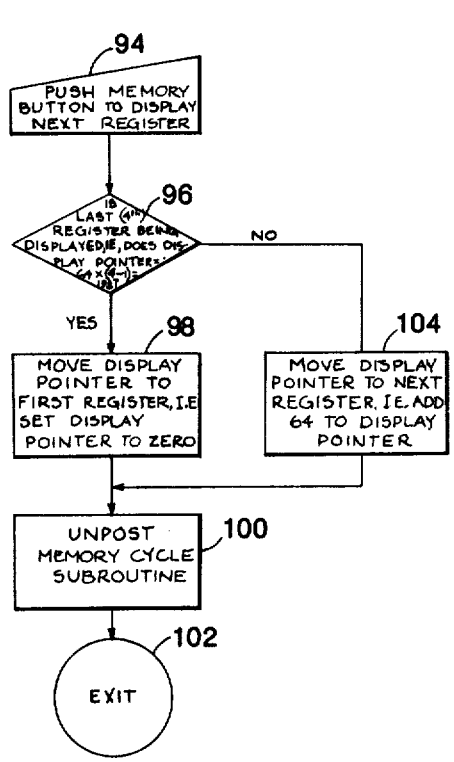
FIG. 7A
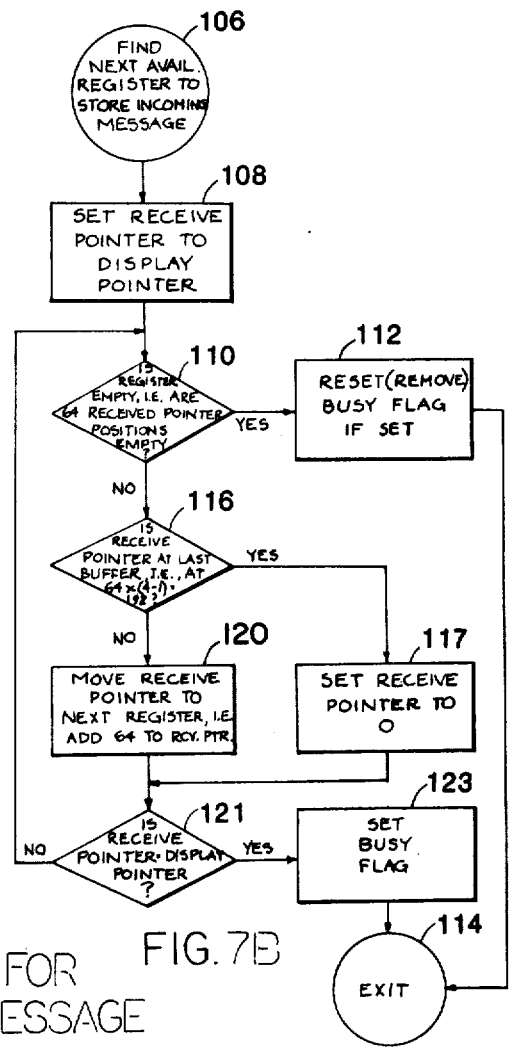
FIG. 7B
FIG. 7— FLOW CHARTS FOR IMPLIMENTING MESSAGE STORAGE

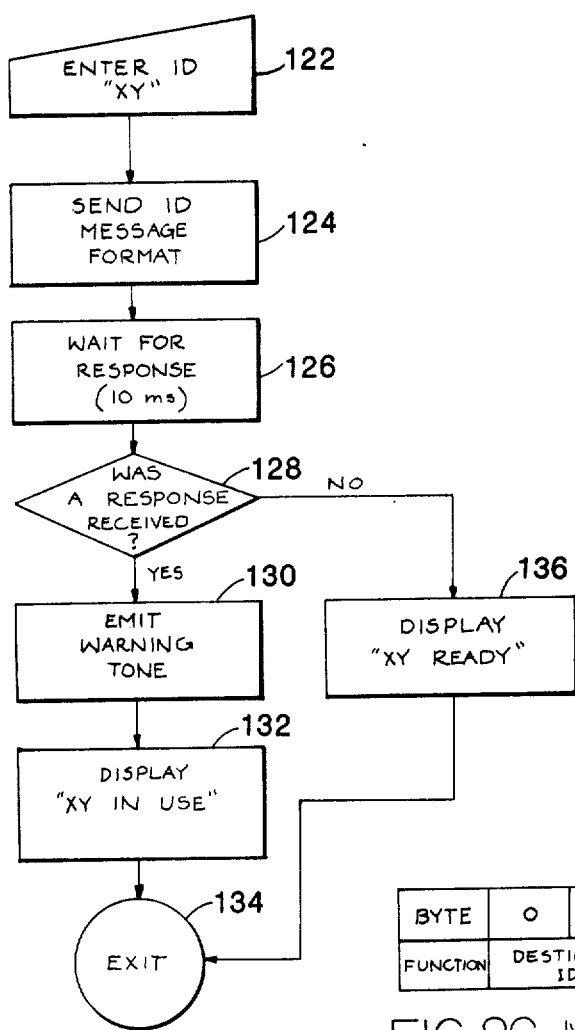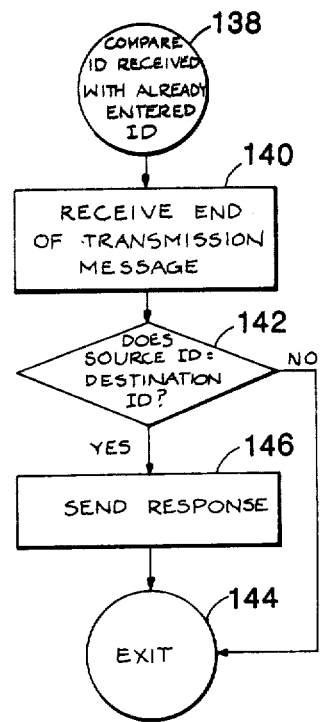
FIG. 8A
FIG. 8B
FIG. 8C—MESSAGE FORMAT FOR CHECKING ID's
FLOW CHARTS & MESSAGE FORMAT FOR CHECKING UNIQUENESS OF ENTERED ID
FIG. 8

VISUAL MESSAGE INTERCOMMUNICATION UNIT AND SYSTEM

BACKGROUND

1. Field of Invention

This invention relates to an intercommunication unit and a system using such units, particularly to a visual intercommunication system utilizing portable terminal units having a display panel and a keyboard.

2. Description of Prior Art

In many offices and businesses there is a need for a compact, flexible communication system which allows personnel to intercommunicate in a simple, reliable, economical, and non-intrusive manner. Heretofore many types of intercommunication systems have been proposed, but each had significant drawbacks. Audio intercoms have been used, but these are intrusive, especially if the person called is engaged in another conversation, generally must be wired to be reliable, often have poor audio fidelity, and require the message receiver to reply immediately in order to inform the sender that the message has been heard. Video and hard copy intercommunications systems have been proposed, but these are large, expensive, require special wiring, and generally have other functions such as word processing, and therefore cannot be used for intercommunication while their other functions are in use. Hand-delivered slips of paper have also been used to communicate messages, but these obviously suffer from serious drawbacks in that they require the sender to walk into the receiver's office or area, which is difficult, awkward, and not feasible if a potential receiver is engaged in a private conference.

Another communication problem arises when a person leaves the office and wishes to leave an appropriate message, e.g., as to expected time of return, etc., with coworkers. Leaving a verbal message with a coworker or a note on the desk is fraught with obvious disadvantages of reliability.

Accordingly several objects of the present invention are to provide an intercommunication unit and system useable in offices and businesses, but which is compact, portable, inexpensive, requires no special wiring, can be used conveniently to generate, transmit, receive, store, and display messages, can be used while intended receivers of a message are engaged in a telephone conversation, or a private conference, without disturbing such intended receivers, can let a sender know that a message has been received without requiring action on the part of the receiver, and does not require the use of hand-carried slips. Further objects and advantages are to provide an intercommunication system which allows selective transmission from one station to any of a plurality of other stations, allows any station to transmit to any of a plurality of other stations and to determine which stations have received a message, allows any station to leave an automatic reply message when the user of such station will be away or preoccupied, requires no printers, hard-copy output devices, or other awkward means. Further advantages and objects of the invention will become apparent from a consideration of the ensuing description hereof.

BRIEF DESCRIPTION OF THE DRAWINGS

FIG. 1 is a diagram of an intercommunication system installation according to the invention.

FIG. 2 shows a layout of the keyboard and display panel of an intercommunication unit of the invention.

FIG. 3 is a system block diagram of the electronic parts of an intercommunication unit.

FIG. 4 is a component block diagram of the electronic parts of an intercommunication unit.

FIG. 5 is a diagram of the message format used in the intercommunication units.

FIG. 6 shows certain hardware used with a message storage version of the invention and FIGS. 7A and 7B show software flow charts for use in said message storage version.

FIGS. 8A, 8B, and 8C show software flow charts and a message format for another modification of the invention wherein the uniqueness of entered identification indicia are checked.

FIG. 1—INTERCOMMUNICATION SYSTEM INSTALLATION

FIG. 1 shows a typical intercommunication system installation according to the invention wherein a plurality of or system of message terminals or intercommunication units are provided on various respective desks which may be in different rooms, in an office or in any other business or domestic environment. For exemplary purposes, four units, 10, 12, 14, and 16, are shown. Each unit comprises a housing or other suitable enclosure 18, on which is mounted a keyboard 20 and a visible display panel 22. Each unit also has an on-off switch 24, and a power cord 26. Cord 26 is plugged into a standard alternating current supply outlet 28 (120 Volts in the U.S.A.), via a standard step-down low voltage power supply transformer 30. (Alternatively, cord 26 may be plugged directly into outlet 28 via a standard 2- or 3-prong plug and the step-down transformer may be incorporated within housing 18.)

Each of the other units 12, 14, and 16 is similarly constructed and is plugged into its respective supply outlet; all of the supply outlets should be wired from the same power company or building supply transformer for the system to be operational. The units can also be used on supply outlets which are wired from different transformers if bypass means, e.g., a capacitor, are provided to interconnect the different secondary systems for radio frequency signals.

In use, any unit can communicate messages and receive messages selectively from any other unit or any other plurality of units, as illustrated by interconnection arrows 32. E.g., terminal 10 can communicate with either terminal 12, terminal 14, terminal 16, or any combination of these terminals; terminal 10 also can receive return messages from any or all of these terminals. All transmissions take place over the AC power lines (not shown) which feed the supply outlets, such as 28.

Selective transmission occurs through the use of identification codes or indicia, preferably initials, which each terminal user enters into such user's terminal upon initial use of the device. In the example shown, the user of terminal 10 has entered the initials "DB", whereupon the unit's display panel reads out the message "DB READY". Similarly, units 12, 14, and 16 have the initials "JK", "PV", and "RG", entered, respectively, and thus also readout their appropriate user's initials in association with a "READY" notice.

FIG. 2—KEYBOARD AND DISPLAY PANEL LAYOUT

The layout of the keyboard and display panel of the units of FIG. 1 is shown in diagrammatic form in FIG. 2. Keyboard 20 has at the left a large section containing data keys, i.e., the letters of the alphabet, decimal numbers, punctuation signs, other symbols, and a space key. The letters of the alphabet are shown arranged in the common "QWERTY" keyboard layout, but any other keyboard layout, such as the more modern Dvorak U.S. Pat. No. 2,040,248, granted 1936), or even alphabetical, can be used.

At the right of keyboard 20 are a set of control keys whose names and functions are as follows:

Shift key 34 enables activation of any of the upper characters on the character keys. When a key is pressed without having first pressed shift key 34, the character or function in the lower half of the key will be entered, e.g., when the leftmost character key in the top row is pressed without pressing shift key 34, the character "Q" will be entered. However, when shift key 34 is first pressed, and thereafter the upper left key is pressed, the character "1" will be entered.

Key 36 has two functions: "DSP MSG" (activated by pressing key 36 after shift key 34 is pressed), and a sinistral arrow (activated by pressing key 36 without shift key 34). The "DSP MSG" (display message) function causes any message stored in a memory of the unit to scroll across display panel 22 from right to left. As indicated, display panel 22 has sixteen sections, each capable of displaying a single character. However, the display memory of the unit can store more than 16 characters, so that key 36 is provided to cause the entire stored message (sixty-four characters) to scroll across panel 22 in a conventional "moving sign" fashion. Since the message scrolls across from right to left, it can be read by an observer; movement of the message stops when its first character is displayed in the first position of panel 22.

Each time the sinistral arrow function of key 36 is activated, the entire message will shift one space to the left; the leftmost character of the message in panel 22 will move off the panel and a new character will enter from the right.

Key 38 also contains two functions: "CLR MSG" (upper) and a dextral arrow (lower). Activation of the CLR MSG (clear message) function causes the entire contents of the memory, including the portion shown in display panel 22, to be erased and the unit to return to the ready state.

Activation of the dextral arrow function of key 38 causes the entire displayed message to be shifted one character position to the right.

Key 40 contains an upper function "En ID" and a lower function "DEL". Activation of the "En ID" (Enter ID) function causes two characters of a user-entered identification (e.g. "DB") to be stored in the identification portion of the unit's memory and causes the message "DB READY" to appear in display panel 22. Activation of the DEL (delete) function causes any character displayed in the rightmost position of display panel 22 to be deleted and all of the remaining characters in memory to the right of the deleted character to move one space to the left, thus filling in the sixteenth position with the next character to the right.

Key 42 contains the "XMT" (upper) and "ACK" (lower) functions. Activation of the XMT (transmit) function causes the contents of the memory, including any control commands and source/designation information, to be sent out over the AC line. After such a transmission, the unit's memory is not erased, so that the message remains in the memory and on display panel 22.

Activation of the ACK (acknowledge) function is performed ater a message has been received and the terminal user wishes to acknowledge manually receipt of the message. By depressing this key, the entire message is caused to scroll across display panel 22 and a control message to be transmitted back to the sending terminal, causing the message to be erased from the memory of the sending terminal, thereby advising the sender that the message sent has been acknowledged by the receiver.

Display panel 22, as stated, contains 16 positions, each preferably being a standard alphanumeric LED (light-emitting diode) sixteen-segment and one dot matrix capable of displaying any of the characters on keyboard 20. Alternatively a dot matrix, e.g., of the $5 \times 7$ array type, can also be used. Also LCD or other types of displays can be used.

When characters are entered onto keyboard 22 they will enter at the 15th position of display panel 22, i.e. the second position from the right, just to the left of the labeled "insert" arrow. As successive characters are entered, previously-entered characters move to the left, to the 14th, 13th spaces, etc.

If a user has entered a word, but has omitted one letter thereof, the missing letter can be inserted by positioning the two letters surrounding the missing letter position in the last and next-to-last spaces of panel 22 (the 15th and 16th positions) and thereafter inserting the missing letter. As indicated by the "insert" arrow, the letter will automatically be positioned in a proper position and all letters to the left of the missing letter will move one space to the left; the letter to the right of the missing letter (in the 16th position) will remain in a fixed position. E.g., if the word "PATENT" was erroneously entered on panel 22 as "PATNT", the missing "E" can be inserted by moving the word (using the sinistral or dextral arrow functions of keys 36 and 38) so that the letters "T" and "N" sandwiching the missing "E", are in the 15th and 16th positions. Then the "E" key is pressed, whereafter the entire word will be entered correctly in memory and can be moved as desired using the arrow keys.

FIG. 3—SYSTEM BLOCK DIAGRAM

A block diagram of the electronic system used in each unit of the invention is shown in FIG. 3. The block diagram of FIG. 3 is general and conveys an understanding of the broad operation of the system; the component block diagram of FIG. 4 is more specific and is useful in conveying and understanding the construction and detailed working of the invention.

The system of FIG. 3 comprises a central processor unit and memory (CPU) 44 which performs all of the logic required in this system, i.e., comparison of an incoming message with a unit's user identification unit, to determine whether a message is meant for that unit, sending of a feedback or acknowledgement signal, control of the display, etc.

CPU 44 is connected to drive a beeper 46, which is provided to emit one or more tones uppon various modes of operations of the system, and to display unit 22, which it controls (via a display driver, not shown). CPU 44 also is connected to keyboard 20; CPU 44 polls or interrogates keyboard 20 periodically to determine which switch in the matrix of switches constituting keyboard 20 has been actuated. CPU 44 converts closed switch positions on keyboard 20 to a standard binary code indicative of the characters and control functions activated. This code preferably is the well-known ASCII code.

CPU 44 is also connected to a universal asynchronous receiver transmitter (UART) or serial-to-parallel converter 48 which converts parallel binary information from CPU 44 to serial binary information and back in well-known fashion.

UART 48 is connected to a carrier current receiver and transmitting unit 50 which converts the serial binary data from UART 48 into a modulated high-frequency signal which is sent out over power line 26 to other terminal units. Also receiver/transmitter 50 converts incoming modulated high frequency signals received on power line 26 to serial binary pulses and sends them to UART 48, which in turn converts them back to parallel form and sends the parallel data to CPU 44.

Not shown in FIG. 3 are amplifiers, where necessary, and a power supply, which also would be connected to power line 26.

OPERATION OF SYSTEM—SET-UP

To facilitate understanding, the operation of the system will be described in a series of sequential steps, based upon typical operation thereof.

1. Plug-In: A user first plugs in and turns on the unit, using power switch 24.

2. Enter ID Display: Display 22 will automatically display the prompting message "ENTER ID", as shown in FIG. 2.

3. ID Entered: The user thereupon depresses any two characters, preferably the user's initials e.g., the initials "DB". Then the user activates the "EnID" function on key 40.

4. Ready: The unit's display panel will verify the initials by showing the messsage "DB READY", as indicated at 22 in FIG. 1. The unit is now ready to transmit and receive messages to other ready terminals.

OPERATION OF SYSTEM—SINGLE DESTINATION TRANSMISSION (DB TO PV)

For transmitting a message from terminal 10 (user DB) to terminal 14 (user PV), the following is a typical sequence of operations.

1. Clearing: If any message is being displayed in DB's terminal 10, this must first be erased. DB presses the CLR MSG function of key 36 to erase the memory, including any portion thereof in display 22, whereupon the message "DB READY" will reappear in display 22, as indicated at 22 in FIG. 1.

2. Enter Destination: DB presses the destination code "PV", indicating user DB will be sending a message to user PV. The initials "PV" will appear in display positions 14 and 15 of DB's display.

3. Enter Message: DB thereupon enters up to a sixty-two character message. The characters will enter at position fifteen of the display and each subsequent character will cause all previously-entered characters to shift one space to the left. E.g., DB may enter the message "JOIN ME FOR LUNCH WITH FRED AT 1:00?" This whole message will not be displayed since it is longer than the number of characters available in display 22. Only the last fifteen characters will be shown upon initial message entry. To prompt the user if the memory becomes filled upon entry of the last (62d character) an audible alert, consisting of four high beeps, will be emitted.

4. Review Message: If DB wishes to review the whole message prior to transmission, DB presses the DSP MSG function of key 36, whereupon the whole message will scroll past display 22 and stop at the beginning of the message, such that the first character of the message is in the first display position and the next fifteen characters will be displayed in the other positions of display 22. The display will thereupon read as follows: "PV JOIN ME FOR L". The rest of the message (non-visible) is stored in the memory within CPU 44 (FIG. 3).

5. Transmission: To send the messsage to PV, DB activates the XMT function of key 42. This causes the message and appropriate control characters to be transmitted over AC line 26 to all terminals. However, only PV's terminal 14 (assuming it reads "PV READY") will accept DB's message into memory since DB's message carries the designation code "PV" as part thereof. All other terminals, not having been programmed with the user identification "PV", will reject DB's message and no acceptance of DB's message will occur thereat. PV's terminal 14 will display "DB" (signifying the code of the originating station) and the first fourteen characters of DB's message. PV's terminal will also emit an audible single high tone beep to alert PV, in a non-intrusive manner, that a messsage has been delivered.

6. Automatic Response: PV's terminal will also automatically send a response or automatic notification-of-message-arrival out on the AC lines. This notification is coded with the initials "DB" so that only DB's terminal will also emit a single audible high-tone beep, thereby letting DB know that DB's message has been received and stored at PV's terminal. The message which DB sent to PV regarding the luncheon request will continue to be displayed at DB's terminal.

7. Manual Acknowledgement: After the destination terminal user PV actually reads the part of DB's message being displayed, PV can send a manual acknowledgement to DB and simultaneously make the rest of DB's message visible by pressing the ACK function of key 42. This will cause DB's entire message to scroll past PV's display window. DB's message will stop with the first character of DB's message positioned in the first position of PV's display. PV's terminal will also send an acknowledgement message (coded with DB's initials) out on the AC line; this acknowledgement message will be received only at DB's terminal. The acknowledgement message will cause the content of DB's memory to be erased so that the luncheon message inquiry will disappear from DB's display and memory and DB's display will revert to showing the "DB READY" message. Both terminals will again emit a single beep to indicate to the sending terminal that the message has been received and to indicate to the receiving terminal that a message has been received.

8. Manual Reply: Thereafter PV can compose and send an appropriate reply to DB in the same manner as DB sent the inquiry to PV.

9. Destination Memory Occupied: If, when DB sent the luncheon inquiry to PV, PV's memory were not clear, the message would not be able to be received at PV's terminal. However, to prompt PV to clear PV's memory and to alert PV that another terminal was trying to send an incoming message, PV's terminal would emit the alert sound, consisting of four high beeps. Also, PV's terminal will automatically send a busy code back to DB, whereupon DB's terminal will emit an audible busy indication, consisting of two groups of two low beeps each. (As indicated below, an optional addition of an incoming message memory can be provided to enable incoming messages to be stored if the display memory is occupied.)

10. Destination Not On: If the destination terminal (PV) were not turned on, or were not plugged in when DB's message was sent, no response will be received from PV's terminal after DB's transmission. DB's terminal will automatically try to resend the same messsage two more times to PV's terminal. If after three tries the message is not accepted by PV's terminal, DB's terminal will make no further tries, and will provide an audible busy indication. DB would have to press DB's XMT key 42 again in order to re-send the message.

11. Lines In Use: If, when DB wishes to send a message to PV, any other terminal is using the AC lines to transmit, DB's terminal will automatically sense the occupation of the lines and wait until the ongoing message transmission is completed. The units will not operate if there are plural simultaneous messages on the AC lines. When the lines are clear, DB's unit will send its message. Means are also provided within the logic system to detect conflicts on the AC line. I.e., if DB and JK initiate a message transmission simultaneously, whichever unit (or both) that detects the conflict will transmit a continuous BREAK character on the AC lines to notify all units transmitting that the conflict exists. All units automatically stop transmitting. Each unit waits a period (calculated from the terminal's ID code) before initiating transmission again. Since every unit has a different ID code, no two units will initiate transmission again simultaneously. The above operation occurs because all terminals in the system share the same AC line and, under program control (listed infra), continuously monitor such line for transmissions. As stated, if any terminal detects that the lines are in use when it is ready to transmit, it is programmed to wait before initiating any transmission, or if it detects a simultaneously-initiated transmission, it is programmed to transmit a BREAK signal and then reinitiate transmission after a preprogrammed period, as determined by the terminal's ID code.

OPERATION OF SYSTEM—AUTOMATIC REPLY MODE

The units are arranged so that any user can have such user's unit respond to all incoming messages with a single outgoing reply message. For example, if PV is away from the desk and out to lunch, PV can set PV's unit to reply to all incoming messages with an appropriate reply message such as "OUT TO LUNCH—BACK AT 2:00 PM". The following sequence of operations would be taken by PV to effect such an automatic reply mode:

1. Clearing: PV clears PV's terminal so that the message "PV READY" appears in the display.

2. Entry of Automatic Reply: PV presses the question mark character key twice ("??") to set the machine in the automatic reply mode. The double question mark is also a mnemonic aid since it is used when PV does not know to whom the outcoming message will be sent. PV thereupon follows the double question mark by an appropriate outgoing automatic reply message, e.g., "?? OUT TO LUNCH—BACK AT 2:00 PM". PV's unit thereupon will be set in an automatic reply mode.

3. Automatic Reply: If DB sends a message to PV as described above, DB's messsage will not be accepted by PV, but rather when DB's message arrives, PV's automatic reply messsage will be sent back to DB and both units will beep (high tone) four times to alert users that the automatic reply mode is in operation. DB's outgoing message will be erased automatically and replaced by PV's automatic reply message, together with PV's initials, which will be placed at the beginning of the message. Thus DB's unit will read "PV OUT TO LUNCH—BACK AT 2:00". Both units will then beep once (high tone) to indicate a completed messsage transmission.

OPERATION OF SYSTEM—TRANSMISSION TO PLURAL DESTINATIONS (BROADCAST MODE DB TO PV, JK, AND RG)

Any user can send the same message to plural destinations in a quasi-"broadcast mode". Moreover, the "broadcaster" (sending-unit) will receive an automatic response or indication of message receipt from those destination units which have received and stored the message. Also, each destination unit will be advised of which other destination terminals have been supplied with the message. E.g., assume that DB wishes to send the same message to PV, JK, and RG. The following sequence of operations will take place:

1. Entry of Broadcast Message: DB presses the bracket symbol before and after the initials of all terminals which are to receive the message, followed by the message itself, e.g., DB presses "[PV JK RG] LUNCH AT ONE?".

2. Transmission: DB presses the XMT function of key 42. Thereupon the same message will be sent to all terminals in sequence, first to PV, then to JK, and then to RG.

3. Receipt At First Destination: If the message is received and stored at the first unit to which the message was sent, i.e., at PV's unit, an automatic response will be sent from PV's unit back to DB's unit. Also DB's unit (as well as PV's) will beep once. DB's display will change to indicate that the message has been received and stored at PV's terminal by moving PV's initials out of the bracket. Thus, DB's memory will store the message "[JK RG] PV LUNCH AT ONE?" and the first sixteen characters thereof will be displayed.

4. Second Destination Memory Occupied: DB's message is thereupon automatically sent to JK's unit; if JK's memory is occupied, JK's unit will sound an alert (four high beeps) to indicate a non-received meassage. DB's unit will emit a busy sound (two groups of two low beeps each). DB's terminal will proceed to try RG's terminal and JK's initials will remain in the brackets at DB's unit.

5. Destination Display: At each destination unit, the message displayed will show the sender's initials, plus the other destination to which the message was sent. E.g., at PV's terminal, when the message is received, PV's display will show "DB[JK RG] LUNCH AT ONE?" to indicate that DB has sent the same message to JK and RG, as well as PV.

If any destination unit is not turned on, the transmitting unit (DB) will emit a busy sound and the destination initials will remain within the brackets.

FIG. 4—COMPONENT BLOCK DIAGRAM

FIG. 4 shows a block diagram of each unit's data processing components and their interconnections.

At the heart of each unit is a central processing unit (CPU) 52 which is an eight-bit, type 8039 microprocessor, manufactured by Intel Corporation, Santa Clara, CA. CPU 52 includes an internal random access memory (RAM), as indicated, for storing composed and received messages and for holding such messages for display. CPU 52 is connected to keyboard 20 by a bus which has five leads, as indicated by the designation "(5)". Terminals P10 to P17, P24 to P27, and T1 of CPU 52 are connected to keyboard 20.

Keyboard 20 comprises a matrix of cross busses with selective interconnects at each key, thereby providing a matrix of single pole, single throw (SPST switches) of well-known type. These are polled by CPU 52 in well-known fashion and interconnects (representing depression of a key) are converted to appropriate character- or control-coded binary signals. The character signals are designated according to the well-known ASCII code (described in, e.g., Popular Electronics, 1974 April, p. 31) and the control signals are coded in hexadecimal form (see below) as follows:
DSP MSG: OE
CLR MSG: OC
SINISTRAL ARROW: 13
DEXTRAL ARROW: OD
EnID: 12
XMT: 08
DEL: OB
ACK: OA CPU 52 is also connected to drive display 22 via a display driver 54, which may comprise a series of appropriate amplifiers and code converters, well-known in the art, for converting the output of CPU 52 to appropriate display-driving signals to drive the individual character positions of display 22. The bus between CPU 52 and display driver 54 is connected to the following output terminals of CPU 52: P10 to P17, P24 to P27, and T1.

CPU 52 also is connected to an address Latch 56 via a bus which is connected to output terminals DB0-DB7 (Data Bus 0 to Data Bus 7) and terminal ALE (Address Latch Enable) of CPU 52. Address Latch 56 receives program addresses generated by CPU 52 and holds them in well-known fashion until they are used by subsequent operational units.

CPU 52 also sends a timing signal from its T0 output to timer unit 58, which may be two 74LS161 timers manufactured by Texas Instruments of Dallas, TX. Such timing signal preferably is supplied at a frequency of 3.33 MHz.

CPU 52 receives an input from two EPROMs (Eraseable, Programmable Read Only Memories), hereinafter ROMs, 60 and 62, each of which may be a type 2708-1 manufactured by Intel. Each ROM can store 1024 8-bit bytes. The outputs of ROMs 60 and 62 are connected in common and to inputs DB0-DB7.

CPU 52 has its write output connected to one input of a NAND gate 53 via an inverter 55.

Address Latch 56 is connected to ROMs 60 and 62, as indicated, output terminals A0-A7 of latch 56 being connected to the address inputs of ROMs 60 and 62. P20 and P21 of CPU 52 are connected to the highest order address inputs (A8 and A9).

Terminal A0 of address Latch 56 is also connected to a D input of a flip-flop 64, terminal A1 is connected to the other input of NAND gate 53. Flip-flop 64 is a D (data) type flip-flop; its other, C (clock) input is connected to the output of NAND gate 53.

The Q output of flip-flop 64 is connected to beeper 46 which is a piezoelectric transducer which will supply either of two different tones, a high tone or a low tone, depending upon the frequency at which flip-flop 64 is switched (under program control) from supplying a logic ZERO (0 volts, normal output) to a ONE (5 volts) and back.

CPU is also connected to a serial-to-parallel and viceversa converter or universal asynchronous receiver transmitter (UART) 68, which may be a type 8251-A manufactured by Intel. Terminals DB0-DB7, Read*, and Write* of CPU 52 are connected to UART 68.

UART 68 also receives three further inputs from timer 58 as follows: a 1.67 MHz signal at its CLK input, and a 111 KHz input at each of its RXZ and TXZ inputs.

Timer 58 also supplies a 278 KHz signal to a modulator 70. Modulator 70 is a simple gate type modulator which receives binary data bytes from the output of UART 68A and passes the high frequency to 278 KHz signal from timer 58 to an amplifier 72 when a binary ZERO is supplied by UART 68 and no signal when a binary ONE is supplied by UART 68.

Amplifier 72 is a linear analog amplifier which amplifies the 278 KHz signal it receives from modulator 70 at an output amptitude of about 10 volts peak-to-peak to a transformer 74 (tuned to 278 KHz) in order to allow the modulator signal to pass and in order to block the 60 Hz signal on power line 26.

The output of tuned transformer 74 is connected to a 120-volt AC power cord 26, which is connected via a standard 2 (or 3) prong plug 76 to a power line (not shown) via a wall terminal outlet (not shown). Power line 26 is also connected to a power supply 78 which is arranged to supply appropriate DC operating voltages for the system, i.e., ±5 volts and ±12 volts, both referenced to ground. As stated above, a step-down transformer of power supply 78 may be combined with plug 76, or all of power supply 78 may be part of plug 76 if desired.

Power line 26 is also connected to a 278 KHz tuned input receiving transformer 80. The output of transformer 80 is connected to an amplifier 82 which amplifies the signal received from transformer 80 four times and supplies it to a high pass filer (HPF) 84 which is designed to block all signals of a frequency lower than 20 KHz, thereby to keep hum and other power line noises out of the system. The output of HPF 84 is connected to a 278 KHz phase locked loop (PLL) circuit 86, which may be a type MC567 manufactured by Signetics Corp., of Sunnyvale, CA. PLL 86 receives 278 KHz bursts from HPF 84 and converts them to DC voltages, in well-known fashion, a burst of AC voltage being converted to a binary ZERO and an absence of a burst being converted to a binary ONE.

The output of PLL 86 is supplied to the input terminal of UART 68.

A reset or initializing circuit of well-known type (not shown) is provided so that when power is first turned on via switch 24 (FIG. 2) (not shown in FIG. 4), CPU 52 will be set to an initial address of ROMs 60 and 62 so that the initial prompting message "ENTER ID", as shown in FIG. 2, will appear on display 22.

Components 52, 56, 58, 60, 62, and 68 can all be implemented in a type 8051 single chip microprocessor manufactured by Intel.

Program ROMs 60 and 62 are preprogrammed with an operating program which will cause the system to operate in accordance with the discussion preceding. Below is a listing of the program loaded into ROMs 60 and 62. Such programming may be effected by programming machines well-known in the art, such as the Minato Model 1860 made by Minato Electronics, Inc., Yokohama, Japan, the Kontron MPP 80SAM made by Kontron Electronics, Redwood City, CA, or the PRO-LOG M980 PROM programmer made by Pro-Log Corporation. Such programmers operate by supplying appropriate address-enabling inputs to the ROMs and reading in the appropriate data at each program address by supplying the data in the form of relatively high voltages.

In the programs below, the first two columns give the first two characters of the address in the program, while the top row in each program gives the third character in the address. Address locations, as well as the contents of each address in the ROM, are indicated in hexadecimal form. As is well-known, a hexadecimal counting system utilizes a base count of sixteen. The actual information stored in each address location in the memory is actually stored in binary form in the form of eight-bit bytes (eight "ONES and ZEROES") according to standard binary notation where successive binary positions starting from the right indicates the presence (ONE) or the absence (ZERO) of successive powers of two in a summed sequence. The following is a table for converting from hexadecimal to decimal to binary numbering.

| Hexadecimal | Decimal | Binary |
|---|---|---|
| 0 | 0 | 0000 |
| 1 | 1 | 0001 |
| 2 | 2 | 0010 |
| 3 | 3 | 0011 |
| 4 | 4 | 0100 |
| 5 | 5 | 0101 |
| 6 | 6 | 0110 |
| 7 | 7 | 0111 |
| 8 | 8 | 1000 |
| 9 | 9 | 1001 |
| A | 10 | 1010 |
| B | 11 | 1011 |
| C | 12 | 1100 |
| D | 13 | 1101 |
| E | 14 | 1110 |
| F | 15 | 1111 |

Thus, looking at row 00, column 3, in the first program below, which indicates the programming of ROM 60 at address location 003, the hexadecimal data characters C4 are found; this indicates that address location 003 of ROM 60 is loaded with a byte equivalent to C4, i.e., 1100 0100. Looking at the last line of the program for ROM 60, at address location 3FF, ROM 60 is loaded with the hexadecimal characters FF, the equivalent byte being 1111 1111.

In the programming chart for ROM 62, 400 should be added to each address so that, e.g., the second row lists the data in addresses 400 to 40F.

```
    0  1  2  3  4  5  6  7  8  9  A  B  C  D  E  F
.00 84 6C 00 C4 00 00 00 00 D5 AF 23 F6 62 B8 25 B9 3D
 01 F1C6161104328F4B930F1C621230134
 02 7DB92611F19632B1E01911F1S6322304
 03 40A0B928F153039641B3202301 40A0BE
 04 2511F19652230840A01911F196522313
 05 40A0B802B928F1B92A51C65D1893FFCE
 06 93B83210F0ABD344C6DFFB03F9F6DB23
 07 F46BB3B835F0C67F07C69BB82D049DB8
 08 33B924F1D28E238051C68F16047B10F0
 09 A9F110B90091B931D1A183B840F00493
 0A B835F0C6AC07C6B8B82E049DB833B924
 0B 238051C68F1004A8B841049DB82B049D
 0C B82C049DB835F00493B235F096DFB833
 0D B924234051C68F23A80493B833048FB8
 0E 31F0B900912304B90191BDFFBEFFF4E1
 0F 2303347D8373A0BCC0C4C9FFFFFFFFFF
 10 1416181A1C1E20222426282A2C2E3032
 11 3436383A24924400C4A9A400C4378481
 12 840084A5A454A4AAC45A84BF84DA8454
 13 C48FC4E044A4E490647764C6B83CB000
 14 B83CF05307AAF05318777777AB4320A9
 15 F1965BBA00FB175303244CFA4360E351
 16 966BFA175307AAC655245BFBE7E7E74A
 17 AA17531FA0FAB334823751A183348241
 18 A183AA53187777774320A9FA5307436S
 19 E383B839F0175307A0AAB825F0B2CC34
 1A EFC6C6232040A0FBBC0412AF77ECAAFC
 1B 07E7E7E74A56B94320B93AA14300E3BS
 1C 3BA12305347D23003477243CB93AF153
 1D 07DA96C634EFC6E9BC0412DF77ECDACC
 1E F15318777777DCC6C623DF50A024C6FA
 1F 473A237F390937530FAB89FF93FFFFFF
 20 B924230251C66DB834F0965B18F19253
 21 232051C63E238051C63AB004B838B08E
 22 B837B000BDFEBEFFF4E12307347D2310
 23 347DF4C923013477243CB003441C2320
 24 41A119F14340A1230F347DB002B838B0
 25 804420B232230C347D4432F1926DF007
 26 966D18F1D23AF1F23A230C4449230451
 27 C632F19298F0B8380707C69F07C6980?
 28 9698B088F1D28CF28C53DFA1D2904494
```

ROM 60 -- HEXADECIMAL PROGRAM

```
29 2309347DB4F5442EB838B090F1448CB6
2A 80F1448CB8825231050C6D5B938F1F2D7
2B D2E94340E3AA530FB92AA1B929FA4743
2C F0A123EF50A0B938F15307D30796D223
2D 40A111243C2440537FA1B92A27A123EF
2E 50A0B92923FFA1243C23103477B825B9
2F 382744D7FFFFFFFFFFFFFFFFFFFFFFFF
30 D2C6D6C9CBAECFD0C5C4C3D5CACDCCA0
31 D7D3D8D9C8CE130BD1C1D4D4C7C20D0A
32 B4ABA7B8EAACB9B0B3AF4EB7D1BFBBA3
33 B2A9A4B6DBADOE12E1 7C 1EFC4E9C81
34 F1F0F0F0F0F0F0F0F1F 1F1F0F1F0F1F1
35 C8E0C8A0C8E0C8F0 1 1E1E1E1
36 0102040B10204C80 E E C5 2 C8C
37 BAA0D2C5C1C4D5B8 F B54AB52 FCA1 8
38 19F0A1230C347DB938B18C2310347D9E
39 235BB80190231490B8242301404A00523
3A 123477243C74DD74E8B871B92BF1A018
3B 19F1A01818BA05237274F6B833B040F4
3C A674DD74E88374CE23133477243CB833
3D 10F0D38096D2B040F4A6B833B3B840F9
3E 4023A0A01BE9E383B840B91023AEA029
3F 030428E9FE93AFE9 0 21BFFE6F283F
     0 1 2 3 4 5 6 7 8 9 A B C D E F
00 B93BF1AAB824F0722443084320A0FAD3
01 A89648F04340A0B93627A1FAD3BF964E
02 238040A0D4CEB833F0A9FAA119F9D380
03 963CB838B0882310347DB97FF9B833A0
04 F4A623063477243C23BF50A0841B237F
05 50A08424B833F007A0D33F9660237FA3
06 F4A6230D3477230E3477243C75B83F27
07 A0E87023F6625525B802902311347D44
08 E2B83BF0F295B68DD312969BF0347D23
09 053477243C2306347D848FB838B09823
0A 10347D848FB837F0D303C6B710230434
0B 7D23073477243C23073477B9244498B8
0C 33F0A9F9D37FC6CF19F1C9A11984C323
0D A0A1230B3477F4A6243C74A5B824F053
0E DF53F7A018F053BFA0230E3477230D34
0F 77230C3477243CFFFFFFFFFFFFFFFFFF
10 B924F1121D19230451C61BF4C5BDFDBE
11 FFF4E1B924230141A1243C2440B935F1
12 C63407C634070707962E2308347D2303
13 3477243CB930F1C641B924230441A1A4
14 2EB925230451C6192307347DBDFCBEFF
15 F4E1A42EB822230150964B8B824230850
16 C67A234050C691B836F09691B941F1D3
17 A9C68A1019F9D380966EB000B938B198
18 2310347D23083477243CF067C67AF67A
19 A0B833B040B83727A0B835A0BDFCBEFF
1A F4E12307347DA4842440B82223015096
1B F3B841B941F0AA18F0AB18BC02F0D3A9
1C C6CAF0A11819ECC2A4BBF8AFB834F0D3
1D 022FA8FFC6EEFAA119FBA1B936F107A1
1E C6E62308347D23093477B4F5243CF0A1
1F 19A4D62440B833B04FF4A683FFFFFFFF
20 D5AFB80180AC23805C961223285C962C
21 146123025CC619F40023285CC629B824
22 230150C629231040A0FFC593B8012304
23 902302347DC412B825230450C65827B8
24 31A0B832A0F4C5B824F053FEA0B80123
25 159023043477243C2440B824F0728518
26 234050C685F053BFA0B835B001B83727
27 A0BDFCBEFFF4E1230E347D2307347D23
28 0A3477243CB838B0982310347DC47FB8
29 25230850C6A723F750A074CEF0D34F96
2A A5230E3477243C2440B935F1C6C80796
2B C2B92BF143E0AE19F143E0ADF4E12307
2C 347D23023477243CB933B140C4B1B833
```

ROM 62 -- HEXADECIMAL PROGRAM (Add 400 to addresses)

```
2D F0A9B87FF8D9C6DFC8F018A0C8C4D493
2E B4F5B838B0802310347D230F3477243C
2F FFFFFFFFFFFFFFFFFFFFFFFFFFFFFFFF
30 B93DB1F3B900814380AAB924F1121083
31 FAB82FD0A0B83010F0ABD344C67DFB33
32 FAF668232A6BB3230241A1B82BFAD3C6
33 3523FD51A183B82CE42DB22D23023103
34 35FAA083B82EE43C23C251C635193.F.
35 330FA09635F1E235BP24CE922F1A1.2.3
36 F1A018B933F8A183230251C635123.?1
37 367DF1B235B833F0A9FAA11C835D2FFC
38 C686231041A12301347D8327363A4443
39 74DDB840BA0A236874F6B933F8A1F4A8
3A 23113477243CB833F0A9BA10B800F818
3B 473AF1533F4380398940C9F9D33F96C2
3C B97FEAAE93B934B1FFB92423EB51A129
3D 3F27A119A1B901234091235B9123102.
3E 13E93DB1F3B92523FB51A1B92673. 233
3F 19A183FFFFFFFFFFFFFFFFFFFFFFFFFF
```

FIG. 4—OPERATION

The system of FIG. 4 operates as follows: when a character key is depressed on keyboard 20, CPU 52 will sense, in one of its cyclical interrogations of keyboard 20, the depression of the character key and convert such key depression to the appropriate ASCII code. CPU 52 will then cause the character to be displayed in display panel 22, as controlled by ROMs 60 and 62.

When a control function key, i.e., one of keys 34 to 42, is depressed on keyboard 20, such depression will be converted to the appropriate binary code indicated above, which will cause an appropriate routine to be posted in CPU 52 which will perform the appropriate function.

The RAM in CPU 52 stores the displayed characters and undisplayed control functions. Upon actuation of a transmission control function (e.g., by depressing XMT key 42), the data in RAM 52 is supplied to UART 68, which converts such data to serial form. Thereupon the data modulates the 278 KHz carrier signal in modulator 70 and is fed out on power line 26. At the same time the data is also returned back to CPU 52 via units 80, 82, 84, and 86 and compared with the data which was sent out. If a conflict is detected, an appropriate break subroutine is called and CPU 52 will cause UART 68 to send out a continuous binary ZERO to modulator 70, whereupon a continuous 278 KHz tone will be sent out on line 26, interrupting all transmissions, as discussed above.

Beeper 46 operates under program control and emits either a 1042 Hz high tone or a 130 Hz low tone, depending upon the rate at which flip-flop 64 is switched. Four different types of sounds are emitted, as noted supra. To review and detail, (1) when a message has been transmitted successfully, both the sending and the receiving unit will emit a single high beep, 123 ms long. (2) If a user makes an error, e.g., by attempting an illegal mode of control key operation, etc., the unit will emit an error signal consisting of the high-low-high-low sequence, each portion being 245 ms long. (3) If a message is sent to a unit which has an occupied memory (or if the auxiliary memory option is employed—see infra. —and all memories are full), the receiving unit will send back a busy code which will cause the sending unit to emit a busy sound consisting of a low-space-low-long space-low-space-low sequence, the low tones lasting 491 ms, the spaces 245 ms, and the long space 737 ms. Also if a message is sent to a non-operating unit by using a non-existent ID, the transmitting unit will emit the busy sound. (4) At the same time the receiving unit will emit an alert sound consisting of four high beeps of 123 ms each, spaced 123 ms apart. The alert sound is also used in the auto-reply mode, and when the source memory becomes full due to excessive key entries, supra.

FIG 5—MESSAGE FORMAT

FIG. 5 shows the format of data and control messages which are sent out by any unit on line 26. A data message consists of 68 bytes, numbered from 0–67. A data message is sent by manual actuation of XMT key 42 (FIG. 2) or upon receipt of an incoming message by any terminal set in the automatic answer mode, supra. Bytes 0 to 1 of the data message contain the destination identification, e.g., if DB sends a message to PV, the first two bytes would be "PV", coded binary form. The second and third bytes contain the identification of the source, e.g., "DB" coded in binary form. The fourth byte indicates the type of message which is being sent (see below), the fifth to 66th byte contain the messsage characters, for a total of 62, and the 67th byte is a check byte which indicates the modulo two sum of the characters actually transmitted.

To review the checking function of byte 67 more specifically, as each character is transmitted it is also added (modulo two) to an accumulated sum in CPU 52. After bytes 00 to 66 are transmitted, a byte representing the sum is transmitted as byte 67. As the message is received at a destination unit, the incoming bytes are added together and accumulated as an 8-bit sum. This sum is compared to the 67th incoming byte. If there is a discrepancy, an appropriate error code will be generated in CPU 52, whereby the message will not be accepted and no automatic response or indication of message received will be sent back. If the comparison is correct, an automatic response will be sent back to the sending unit.

As another check, and odd-parity bit is provided in each character byte. I.e., each character byte from 0 to 67 contains eight bits. Only seven of these are used for indicating the character. The eighth bit in each byte is an odd-parity check bit, which is automatically supplied or not supplied by the CPU such that the number of ONES in each byte will always be odd. Thus if the number of one bits received in each byte is not odd, an appropriate error signal will be generated in the CPU to indicate an error in transmission and an incoming data message will not be accepted.

Byte 4, as stated, indicates the type of message which was sent. The only data message which can be sent is the standard transmission message, for which the message-type code "00" is supplied (in binary form) is byte 4 of the message format.

All other messages are control messages. As can be seen in FIG. 5, the control message function positions are the same as those of the data message function positions, except that message character bytes 5 through 66 and check byte 67 are omitted; instead the 5th byte is used as a check byte, i.e., the number supplied in the 5th check byte is equal to the modulo two sum of bytes 0–4.

The following types of messages can be sent as control functions and the following respective message codes are used. For an automatic response or indication of message received and stored, the code "02" is supplied in byte 4. If the receiving unit is busy, the code "03" will be supplied, and if a manual acknowledgement is initiated by depressing acknowledgement key attempted to enter the ID characters "XY", and XY has already been entered at another terminal, the display will display the message, "XY IN USE", as indicated. Thereupon the subroutine is exited (box 134).

If the decision in box 128 is NO, i.e., no response was received after the appropriate waiting period, this indi- 42, the code "01" will be supplied. If the destination terminal has an autoanswer message, it will respond with a "04" code.

ADDITION OF MEMORY

In addition to the functions aforedescribed, each unit can be provided with an expanded random access memory, whereby any unit can store several messages in either the sending or receiving mode. In the receiving mode, messages can be stored and later recalled if the display memory is currently occupied. In the sending mode, a partially-composed message can be stored for later recall if a user desires to interrupt composition of the message to receive an incoming message or to recall another message which has been stored in memory.

To add the memory feature, certain hardware changes are necesssary, as indicated in FIG. 6. First, a memory key 88 is added to keyboard 20. Also an associated message-in-memory indicating lamp 90 is added, either adjacent memory key 88 or adjacent or as part of display panel 22. A memory would be added by means of a RAM (random access memory) 92, which can be a type 8155-2 manufactured by Intel. As indicated, RAM 92 has eight leads connected to address latch 56, specifically the address outputs of latch 56 which are connected to ROMs 60 and 62. RAM 92 also supplies eight outputs to terminals DB0-DB7 of CPU 52 and receives three control imputs (Read*, Write*, and P24) from CPU 52. FIG. 7 indicates logic flow charts for implementing the message storage capability area.

FIG. 7A illustrates a flow chart of operations following a manual operation in which a terminal user presses button 88 (indicated by manual input box 94) to cause such user's terminal to display the information in the next, undisplayed message register of the memory. In the example given, it will be assumed that memory capability is provided to handle four incoming messages; however message storage can be readily increased to store as many memories as desired. Each message is stored in a 64-byte register.

Next a logic decision is made, as indicated in diamond (decision) box 96. This decision determines whether the current register being displayed is the last (i.e., 4th) register; this determination is made according to whether the display pointer, which is a control register in CPU 52 which determines which register of memory RAM 92 is currently displayed, is storing a number equal to the position of the first byte of the last buffer. This byte would be byte number $64 \times (4-1) = 192$, as indicated.

If the last buffer is being displayed, a YES decision will be made in box 96, whereupon (box 98) the display pointer will be moved to the first register, i.e., it will be set to 0 so that the contents of the first register will be displayed. Thereupon (box 100) the memory cycle subroutine will be unposted and exited (box 102).

If the decision in box 96 is NO, i.e., the last register is not being displayed, or the display pointer register is not set at 192, the NO output of diamond decision box 96 will be followed to box 104. As indicated in box 104, the display pointer will be moved to the next register, i.e., a count of 64 will be added to the display pointer register so that it will point to the first byte of the next register, whereupon the next register will be displayed and the memory cycle subroutine will be unposted and exited (boxes 100 and 102).

This operation is manually repeated until the desired register is displayed in display panel 22.

FIG. 7B indicates the automatic sequence of operations whereby a unit finds the next available register to store an incoming message, as indicated by connector (circle) box 106. When an incoming message is received, a receive pointer register, which selects the register to which the incoming message will be sent, is automatically set to the first byte of the register being displayed, i.e., to the display pointer (box 108).

Then (diamond decision box 110) a determination is made as to whether this register is empty, i.e., are bytes 0–63 empty? If the decision is YES, a busy flag, if set, will be reset or removed (box 112) and the subroutine will be exited (lock 114). The received message thus will be sent to the first buffer being displayed.

However, if the decision in box 110 is NO, i.e. display pointer positions 0–63 are not empty, this indicates that the register being displayed is occupied, and a subsequent decision will be made (box 116) as to whether the receiver pointer is set to the first byte of the last register, which would be byte 192.

If the receiver pointer is at the last register, the output of box 116 will be YES decision, thereby indicating that the next buffer to be examined begins at byte 0. The receive pointer is thus reset to 0 (box 117).

If the decision in box 116 is NO, then the receive pointer is incremented by 64 (box 120) to move it to the next register.

Next (box 121) a decision is made as to whether the receive pointer register's setting now equals that of the display pointer. If YES, all registers are occupied and the busy flag is set (box 123) and the subroutine is exited (box 114). Thereupon a busy signal will be sounded as part of the busy subroutine (not shown) when the busy register is interrogated.

If the decision in box 121 is NO, control is returned to box 110 and the search continues until either an empty register is found or until it is determined that all registers are busy.

FEATURE FOR PREVENTION OF DUAL USE OF SAME ID

An additional optional feature which may be conveniently added is to insure that in any operating system of units, the same user ID can be used at only one unit. This obviously prevents confusion and also insures privacy since if two users can enter the same ID on a system, a message sent for one of such users will also be received by the other of such users, so that the message will have lost its intended privacy.

To insure that each ID is only used once, a check is made upon entry of a user's ID to insure that no other unit is currently using the same ID. If any unit is currently using the same ID as one entered, the second entry of the same ID will be prohibited and instead the user attempting to enter a duplicate ID will be appropriately advised that said ID has already been selected.

FIG. 8 indicates the flow chart and the message format for use and checking the uniqueness of an entered ID. FIG. 8A shows the operations which occur when a user enters a ID (box 122). Upon entry of a user ID, e.g., "XY", the machine sends an ID message format (box 12) to all other units. The message format is indicated in FIG. 8C. The machine thereupon waits a brief period (10 ms—box 126) for any response.

Next, a decision is made (box 128) to see if a response was received. If a response was received, the YES output of box 128 will be followed, and an appropriate warning tone will be emitted (box 130). This tone may be the same as the four-note alarm signal aforedescribed. Also (box 132) the display will display a message that the ID is in use. In the example, where a user has cates that the entered ID is not already in use, whereupon the display will display (box 136) a notation that the unit is ready, e.g., "XY READY".

As indicated in FIG. 8B, at each receiving unit where an ID has been properly entered, a subroutine is initiated to compare a received identification with a newly entered identification to see if said identification was unique (box 138).

First (box 140) the receiving unit notes the end of transmission of the message. Thereupon the system makes a determination (box 142) as to whether the identification for which entry is being attempted equals the identification already set at the destination.

If there is no equality, the NO output of box 142 is followed and the subroutine is exited (box 144) and no return response is sent, whereupon (NO output of box 128 in FIG. 8A), the ID will be entered and the "READY" message will be displayed.

However, if there is an equality between the source identification which is being entered and the identification at the destination, the YES output of block 142 will be followed and the destination will send out a response according to the ID message checking format (FIG. 8C). The YES decision from box 128 (FIG. 8A) will be followed. Thereupon the subroutine will be exited (box 144).

FIG. 8C shows the message format which is sent out when entry of an ID is attempted (box 124 of FIG. 8A) or when a response is sent out when an ID is already in use (box 146 of FIG. 8B). The ID checking method format has six bytes. Bytes 0 and 1 indicate the ID of the destination and bytes 2 and 3 indicate the identification of the source. Byte 4 indicates the type of message and byte 5 is a check byte.

While the above description contains many specificities, these should not be considered as limiting the scope of the invention, but rather as exemplary of a preferred embodiment thereof. Various other ramifications and modifications will be apparent to those skilled in the art. For example, instead of transmission by carrier current on an AC supply line, transmission can also be by ultrasonic signals, radio frequency airwave signals, optical means, etc. While the individual terminal units are shown as separate units, these can be incorporated within another device, such as telephone, a calculator, etc. While the machine is shown as fabricated of the separate units shown in FIG. 4, all of these can be incorporated in one larger CPU or can be implemented by discrete logic units. In lieu of a single acknowledgement key, a plurality of keys, each controlling a single predetermined reply message (e.g., "ON PHONE—CALL LATER", "IN CONFERENCE", etc.) can be provided. Various changes in the program may be foreseen by those skilled in the art within the scope of the invention. Accordingly, the scope of the invention should be determined only by the appended claims and their legal equivalents, rather than the examples given.

We claim:

1. For use in a visual message intercommunication system, a message terminal unit, said unit comprising:
   (a) a keyboard comprising a plurality of data entry keys and visible message display means,
   (b) display control means for causing data entered on said keyboard to be displayed on said display means,
   (c) transmitting means for causing data entered on said keyboard and displayed on said display means to be transmitted upon user command to an output of said unit,
   (d) receiving means for automatically storing and displaying a message received from another unit and for transmitting an automatic response message to an output of said unit upon receipt of such message, and
   (e) means for alerting a user in response to any reception of an incoming automatic response message from another unit.

2. The unit of claim 1 further comprising means for connection to a power distribution line and wherein said transmitting means for causing data to be transmitted is arranged to transmit said data via said power distribution line.

3. The unit of claim 2 wherein said means for causing data to be transmitted via said power distribution line is arranged to supply said data via an alternating current carrier of higher frequency than that carried on said power distribution line.

4. The unit of claim 1 further comprising means for manually transmitting an acknowledgement of a received message and means for alerting a user upon receipt of an acknowledgement of a received message from another unit.

5. The unit of claim 1 further comprising means for clearing a transmitted message from said display means upon receipt of an acknowledgement of a received message from another unit.

6. The unit of claim 1 further comprising means for entering source identification indicia, means for automatically appending said indicia to transmitted messages, means for entering destination identification indicia, means for automatically appending said destination indicia to transmitted messages, means for receiving only messages from another unit having destination indicia identical to said entered identification indicia and for displaying said other unit's identification indicia with received messages.

7. The unit of claim 6 wherein said means for transmitting an automatic response is arranged to automatically address the source from which a message was received.

8. The unit of claim 6 further including means for entering plural destination identification indicia, means for annexing said plural destination identification indicia to transmitted messages and means for indicating which ones of plural destination units have returned an automatic response.

9. The unit of claim 1 further including means for entering and storing an automatic reply message and for transmitting said automatic reply message upon receipt of an incoming data message, including means for displaying an automatic reply message received from another unit in lieu of a displayed transmitted data message.

10. The unit of claim 1 further including means for storing plural incoming messages and for selectively displaying any of said plurality of received incoming messages.

11. The unit of claim 1 further including means for entering a user identification indicia and for automatically transmitting a check message to check for a duplicate of said identification indicia to a plurality of other units upon said entry, and further including means for comparing, upon receipt of such check message, for a duplicate of identification indicia between entered source indicia and received indicia, and for transmitting a duplicate-detected return message if such a duplicate is detected.

12. The invention of claim 1, further including a plurality of said units, each unit being substantially identical, said units being all connected via a common transmission medium.

13. The invention of claim 12 wherein said common transmission medium is a supply power line.

14. The invention of claim 13 wherein each unit in said plurality of units contains means for detecting if another unit is attempting to transmit a message simultaneously as it is attempting to transmit and for interrupting transmission upon such detection.

15. The invention of claim 13 wherein at least three units are provided, each unit containing means for determining if any other units are communicating when it initiates transmission of a message and for interrupting transmission and retransmitting after a delay if such a determination is made.

16. The system of claim 1 wherein said unit comprises a display panel comprising a plurality of display positions, said unit having means for storing a message having a greater number of characters than said plurality of display positions, and said units containing means for scrolling a messsage past said display positions so that the entire message can be read in said display panel.

17. The unit of claim 1 further including means for providing an indication of message not received if a message is transmitted and an automatic response message is not received thereafter.

18. The unit of claim 1 further including means for transmitting a memory occupied message if an incoming messsage is received and memory capacity is not available to store said incoming message, and further including means for providing a memory occupied indication if a message is transmitted and a memory occupied message is returned from another unit.

* * * * *